(12) United States Patent
Taniguchi et al.

(10) Patent No.: US 6,530,671 B2
(45) Date of Patent: *Mar. 11, 2003

(54) LIQUID CRYSTAL DISPLAY

(75) Inventors: Hitoshi Taniguchi, Yokohama (JP); Yasuo Hira, Yokohama (JP); Yuji Mori, Urizura-machi (JP); Hisao Hirayama, Mobara (JP); Toshitsugu Miyawaki, Chounan-machi (JP)

(73) Assignees: Hitachi Electronic Devices Co. Ltd., Mobara (JP); Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/028,824

(22) Filed: Dec. 28, 2001

(65) Prior Publication Data

US 2002/0085368 A1 Jul. 4, 2002

Related U.S. Application Data

(63) Continuation of application No. 09/257,062, filed on Feb. 25, 1999, now Pat. No. 6,334,689, which is a continuation-in-part of application No. 08/791,513, filed on Jan. 30, 1997, now Pat. No. 5,961,198.

(30) Foreign Application Priority Data

Feb. 27, 1998 (JP) ............................................. 10-046729
Mar. 31, 1998 (JP) ............................................. 10-085484

(51) Int. Cl.$^7$ ................................................. F21V 7/04
(52) U.S. Cl. ............................ 362/31; 362/339; 362/19; 349/65
(58) Field of Search ............................... 362/19, 31, 26, 362/561, 330, 339; 349/62, 65

(56) References Cited

U.S. PATENT DOCUMENTS

| | | |
|---|---|---|
| 5,079,675 A | 1/1992 | Nakayama |
| 5,134,549 A | 7/1992 | Yokoyama |
| 5,288,591 A | 2/1994 | Blonder |
| 5,339,179 A | 8/1994 | Rudisell et al. |
| 5,377,084 A | 12/1994 | Kojima et al. |
| 5,386,347 A | 1/1995 | Matsumoto |
| 5,394,308 A | 2/1995 | Watanabe et al. |
| 5,396,406 A | 3/1995 | Ketchpel |
| 5,408,387 A | 4/1995 | Murase et al. |
| 5,408,388 A | 4/1995 | Kobayashi et al. |
| 5,420,761 A | 5/1995 | DuNah et al. |
| 5,450,292 A | 9/1995 | Yokoyama et al. |
| 5,461,547 A | 10/1995 | Ciupke et al. |
| 5,485,291 A | 1/1996 | Qiao et al. |
| 5,485,354 A | 1/1996 | Ciupke et al. |

(List continued on next page.)

FOREIGN PATENT DOCUMENTS

| | | |
|---|---|---|
| JP | 62-30380 | 8/1994 |
| JP | 6-281814 | 10/1994 |
| JP | 8-43635 | 2/1996 |
| JP | 9-222514 | 3/1997 |

*Primary Examiner*—Sandra O'Shea
*Assistant Examiner*—Ali Alavi
(74) *Attorney, Agent, or Firm*—Antonelli, Terry, Stout & Kraus, LLP

(57) ABSTRACT

A liquid crystal display having a liquid crystal display panel having a plurality of liquid crystal cells, and a back light that irradiates the liquid crystal display panel with irradiation light. The back light includes a light source, and a light guide plate having one side arranged adjacent the light source and having a planar surface with a plurality of small concaves. The planar surface is almost parallel to a liquid crystal cell face, and a plane shape of the small concaves is almost rectangular.

14 Claims, 13 Drawing Sheets

U.S. PATENT DOCUMENTS

| | | | |
|---|---|---|---|
| 5,521,796 A | | 5/1996 | Osakada et al. |
| 5,575,549 A | | 11/1996 | Ishikawa et al. |
| 5,584,556 A | | 12/1996 | Yokoyama et al. |
| 5,608,837 A | | 3/1997 | Tai et al. |
| 5,649,754 A | | 7/1997 | Matsumoto |
| 5,719,649 A | * | 2/1998 | Shono et al. ................. 349/65 |
| 5,856,855 A | * | 1/1999 | Mol et al. .................... 349/115 |
| 5,914,760 A | * | 6/1999 | Daiku ......................... 349/62 |
| 5,961,198 A | | 10/1999 | Hira et al. |
| 6,099,134 A | * | 8/2000 | Taniguchi et al. ............ 349/65 |
| 6,147,725 A | * | 11/2000 | Yuuki et al. .................. 349/61 |

\* cited by examiner

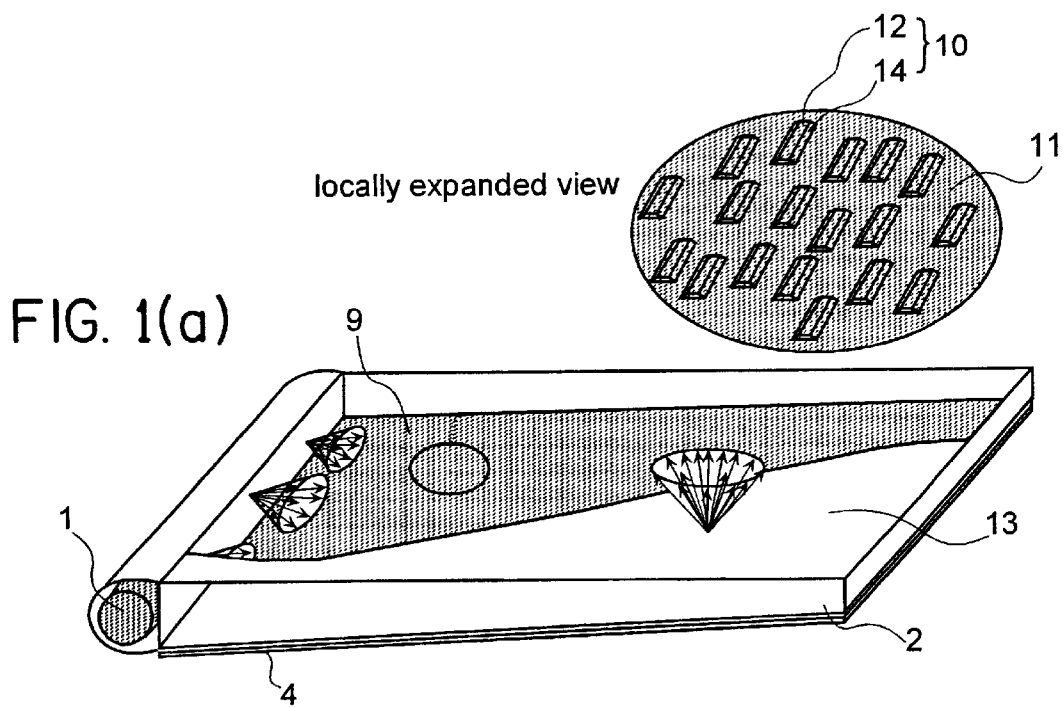
FIG. 1(b)
locally expanded view
FIG. 1(a)
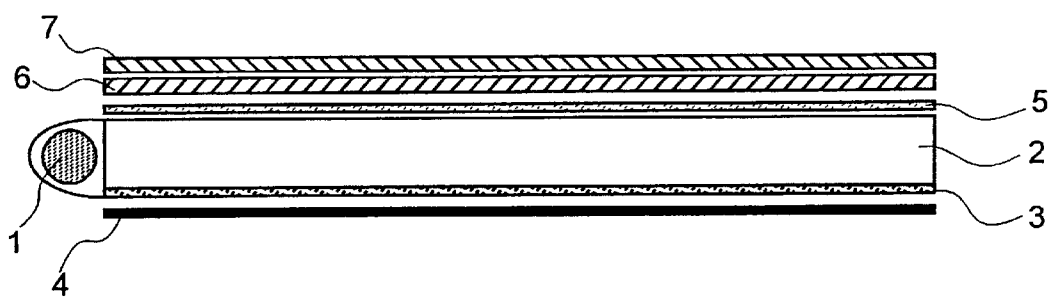
FIG.2
(PRIOR ART)

LIQUID CRYSTAL DISPLAY

CROSS REFERENCE TO RELATED APPLICATION

This is a continuation of U.S. application Ser. No. 09/257,062, filed Feb. 25, 1999, now U.S. Pat. No. 6,334,689, which is a continuation-in-part of application Ser. No. 08/791,513, filed Jan. 30, 1997, by some of the inventors herein and having a common assignee, now U.S. Pat. No. 5,961,198, issued Oct. 5, 1999, the subject matter of which is incorporated by reference herein.

BACKGROUND OF THE INVENTION

The present invention relates to a liquid crystal display using a component for liquid crystal displays, such as rear illumination equipment.

In recent years, the implementation of personal computers, inclusive of so-called word processors, in a small size has been promoted, and portable type personal computers, known as lap-top type or notebook type computers, are now widely used. In such a portable type personal computer, a liquid crystal device is commonly used as a display unit. In this regard, there is an increasing tendency for adopting a color display in portable type personal computers. In line with such a trend, a backlighting type display device is coming into wide use, in which a light source is disposed at a rear side of a liquid crystal display screen for lighting the whole display screen from the rear or back side. Needless to say, the backlighting light source for the color liquid crystal display device is required to emit light with high luminance. Besides, it is necessary to illuminate the display screen with uniform luminance over the whole planar surface thereof. Luminance of the backlighting can easily be increased by increasing the luminance of the light source. However, taking into consideration the fact that a portable-type personal computer or word processor or the like is usually operated br using a battery or storage cell, a limitation concerning the voltage supply is necessarily imposed on any attempt to increase the luminance of the light source. Stated in another way, no other effective method or measures for increasing the luminance of the liquid crystal display screen have been proposed to date.

For having better understanding of the present invention, a description will first be made in some detail of conventional liquid crystal display devices, such as disclosed, for example, in JP-A-4-162002 and JP-A-6-67004. FIG. 2 shows a lateral source type backlighting device employed conventionally in a liquid crystal display device known heretofore. Referring to FIG. 2, a lamp, such as a cold-cathode discharge tube or a hot-cathode discharge tube, is employed as a light source 1 which is disposed at and along one lateral side of a light guide plate (also known as optical waveguide plate) 2 which is made of a light-transmissive material. Here, an optical scattering layer 3 from which light is scattered and reflection sheet 4 that causes light to reflect are provided on the underneath side of said light guide plate 2. And, a diffusion sheet 5, that consists of synthetic resins of milk-white color that have an optical scattering effect, is provided in the area over the surface of said light guide plate 2 to pass and to illuminate the whole face with a uniform brightness. In addition, a first condensation sheet 6 to converge diffused light to some extent on the face and to improve the brightness of the front face of the display and a second condensation sheet 7 are arranged above the diffusion sheet 5. As to the optical scattering layer 3, which is shown in more detail in FIG. 3, it consists of a plurality of ink dots 8, formed of optical scattering materials, such as oxide titanium, arranged on the surface of light guide plate 2. As the distance increases from the light source 1, the optical intensity from light source 1 is reduced. Therefore, as the distance increases from the light source 1, as shown in FIG. 3, the area of the ink dots 8 is increased.

As described above, there is a problem of the brightness declining due to the loss of optical scattering in conventional illumination equipment. The reason is because light is emitted from light source 1, conducted to light guide plate 2, scattered by optical scattering material 8 that is contained in the optical scattering layer, passes through a diffusion board later, and then irradiates a liquid crystal element.

There is a light guide plate not using ink dots, to solve this problem, as described in JP-A-9-269489. This light guide plate has a small convex or a small concave area formed on the surface thereof. These small convex or small concave areas reflect light, and a liquid crystal element is illuminated thereby. But the shape and distribution of these areas were not optimized, and so there was still room for a further improvement in brightness.

In addition, as one of the narrow advances that led to an improvement in the brightness of a liquid crystal display, it has been proposed that the permeative rate of a polarization filter should be raised. The polarization filter is an element that is arranged between a liquid crystal cell and the back light and which has the function of passing only a specified polarization light into a liquid cell. The polarization filter can be manufactured by adsorbing a dichroic material in the micell pipe of a macromolecule film that generally arranges a micell in a constant direction. As a macromolecule film, polyvinyl alcohol is used. Between rollers on which this polyvinyl alcohol spins at a different speed, it is drawn about 3–5 times in the constant direction. The micell of a drawn PVA (polyvinyl alcohol) is arranged in the drawing direction, and the arranged film has a strong double refraction. There are halogen materials, such as a iodine and a dyestuff, as a material to give dichroism. By adsorbing the above material in the film being drawn, polarization characteristics are expressed. As for the above polarization filter, a polarization separation function is gained easily. But the permeative rate is small, being 50% or less. Because a dichroic material is used theoretically, polarization light that is orthogonal with the polarization light that is transmitted is absorbed. Therefore, it is a present condition that 50% or more of the optical energy is lost by a polarization filter, and the brightness of a liquid crystal display element using such a filter is remarkably reduced as a result.

It has been proposed to adopt a method of using a polarizability film of a reflection type as a means of obtaining improved brightness. A polarizability film of a reflection type is a film that has a property such that all polarization components other than a polarization component of a specific kind are reflected and only the specific polarization component is passed, like a cholesteric liquid crystal film, etc. That is, the polarizing natural light that comes out through a light guide plate is applied to a polarizability film of a reflection type, whereby only a specific polarization component is transmitted, and all other polarization components are reflected. A reflected polarization component is reflected again by a reflection board later, the polarization state is changed, it is applied to the polarizability film of a reflection type again, and only the specific polarization component is allowed to pass through. By repeated reflections, all components of light can be used.

A method of using a cholesteric liquid crystal film representing a polarizability film of a reflection type has been proposed in JP-A-3-45906 and the JP-A-6-281814. The cholesteric liquid crystal film consists of optical active layers of a polymer material that has cholesteric regularity. The cholesteric liquid crystal film transmits only a circular polarization component of the same direction as the spiral direction of a cholesteric layer in the polarizing natural light that comes out through a light guide plate from the light source, and the circular polarization component of a reverse direction is reflected. Therefore, when has the structure shown in FIG. 16, a reflected circular polarization component is reflected again with a reflection sheet, it is returned, it returns it to a state that is close to natural light, and the cholesteric liquid crystal film is entered again. By a repeat of this cycle, all components of light can be used. When a ¼ phase sheet is formed on the surface at which light appears on this cholesteric liquid crystal film, a circular polarization component is converted into a straight line polarization, and so the arrangement can be used as rear luminescence equipment for a liquid crystal display.

The brightness of a liquid crystal display using a cholesteric liquid crystal film becomes double the brightness of the liquid crystal display which uses an ordinary polarization filter from theoretical viewpoint. But, in case a light guide plate of the ink dot type, that is widely used at present, and a cholesteric liquid crystal film are combined, the results are unsatisfactory. The reason is because it incurs a loss due to the scattering mentioned above, and when the light which does not pass through the cholesteric liquid crystal film is reflected, the circular polarization that is injected into the light guide plate again is reflected (diffusion) by an ink dot, and loss by scattering occurs, and the polarization state also is degraded further. And, as for the dot, the size is quite large, and so it is necessary to use a diffusion sheet in combination to prevent dot visibility, with the result that the brightness improvement effect declines further. In case it is combined with a prism sheet that optimizes the angle of distribution of the light that comes out and that improves front face brightness, the brightness improvement effect is not more than 10%.

However, a method of combining the light guide plate that is formed with a grating of grooves in the surface thereof and a cholesteric liquid crystal film has been proposed in JP-A-9-102209. This combination produces high brightness, because it has a small loss by scattering, and comparing the brightness improvement effect with that of a printing dot, it is high.

But as for the light guide plate that is formed with grating grooves, it is difficult to control the brightness distribution in the X direction, and it is expected that problems with the cost of metal mold manufacture and with meeting an appointed date of delivery is also large. In addition, there is a fear of a low mass production. The reason is because, from the point of view of surface roughness, soft metals, such as brass, must be used as a metal mold material. In addition, it is expected that moire will easily occur between periodically formed grating grooves and a liquid crystal cell. And, as for the grating grooves, the period is quite large, it is necessary to use a diffusion board in combination, and so the brightness improvement effect has a tendency to decline further. In case it is combined with a prism sheet that optimizes the angular distribution of the light that comes out and that improves the front face brightness, its brightness improvement effect is not more than 20%.

To irradiate the liquid crystal element side with light from a light source using scattering provided by an ink dot with conventional equipment such as that described above, light is absorbed at the time of being scattered by the ink dot, and so there is a limit to the improvement in efficiency available with such a system. And, with regard to a light guide plate not using ink dots, the shape and distribution of the light are not optimized, and so there is room for an improvement in brightness. In the combination of a light guide plate using the ink dot method and a cholesteric liquid crystal film, the brightness improvement effect is as low as 10%. While the combination of the light guide plate having grating grooves and a cholesteric liquid crystal film, the brightness improvement effect is only as high as 20%, and so it is difficult to control the brightness distribution and to economically manufacture the light guide plate.

SUMMARY OF THE INVENTION

To solve the problems inherent in conventional devices, the present invention is proposed.

It is an object of the present invention to provide a liquid crystal display that can improve brightness without enhancing conventional faults and without increasing the brightness of the light source.

In this regard, by using a light guide plate that has formed therein several small concaves (called dots in the following description) to convert the direction of light waves in the light guide plate from a specified direction toward the liquid crystal display, and by properly designing the plane shape and a section inclination angle of the dots, the objects of the present invention can be achieved.

A reflection sheet is arranged underneath the light guide plate. In addition, illumination light that has a proper angular distribution from the light emitting face to the prism sheet that has a proper prism vertical angle according to a requirement can be used to irradiate a display element.

In addition, the dots are arranged at random to prevent moire from occurring. And, light comes out of a dot with a specified density distribution, and so equalization of the brightness distribution of light is achieved.

In addition, between the light emitting surface and liquid crystal unit, a polarizability film of a reflection type (cholesteric liquid crystal film, ¼ phase sheet, etc) is arranged, with a result that brightness is improved.

BRIEF DESCRIPTION OF THE DRAWINGS

FIG. 1(a) is the perspective view of the illumination equipment that is used for the liquid crystal display according to an embodiment of the present invention and FIG. 1(b) is an enlarged view of a portion thereof.

FIG. 2 is a sectional view of a conventional light guide plate using a dot printing method.

DESCRIPTION OF THE PREFERRED EMBODIMENTS

Figure 3:
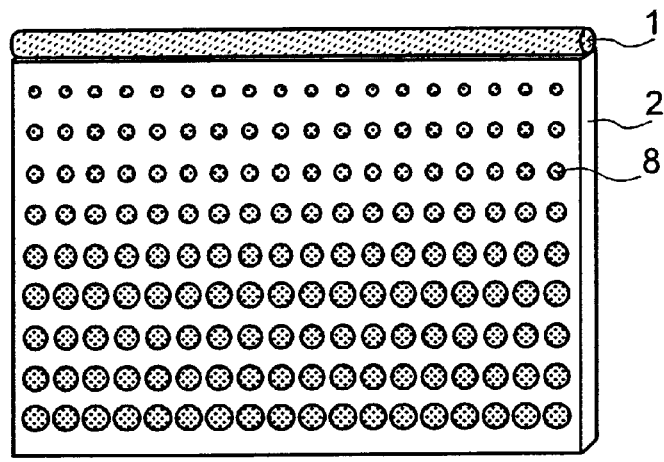
FIG. 3 is a diagram of a conventional dot printing arrangement.

The perspective view of an embodiment of the present invention is shown in FIG. 1(*a*).

To convert the direction of a light wave in the light guide plate to a specified direction, dots 10, that are made up of several small concave areas, are formed in the under surface 9 of the light guide plate of the light source equipment that is used for the present invention. Each dot is a small concave area that consists of a dot bottom that exists in the surface 11 (face from which it comes out) and includes a dot bottom part 12 (extending at an angle relative to face 13 of 5° or less) spaced from the underneath surface of the light guide plate and dot side sloping surfaces 14, as shown in FIG. 1. (However, because the view in FIG. 1(*a*) is from the inside of a light guide plate, each small concave appears in the drawing as a small convex, as shown in the enlarged view in FIG. 1(*b*))

Figure 4:
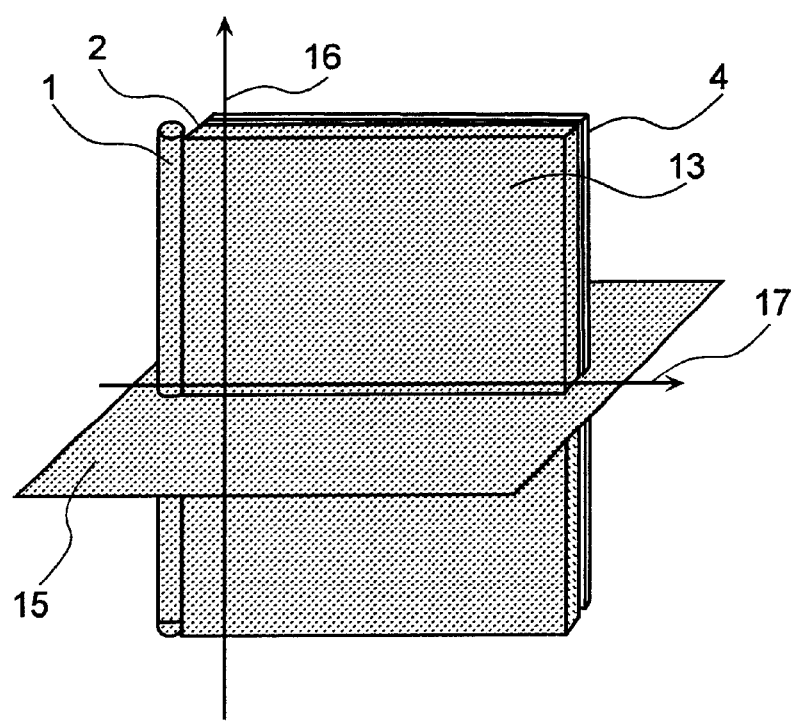
FIG. 4 is a diagram of the cutting direction of a light guide plate.

FIG. 4 shows the various directions relative to the light guide plate 2 to aid in the following explanations. In a case in which the light source 1 is a linear light source, a plane that is perpendicular to the light source is designated as a light guide plate section 15. The direction that is parallel to the axis of the light source is designated as the X direction 16, and the direction that is parallel to the face 13 and is perpendicular to the light source, representing the direction from which light comes out from the light guide plate, is designated the Y direction 17.

Figure 5:
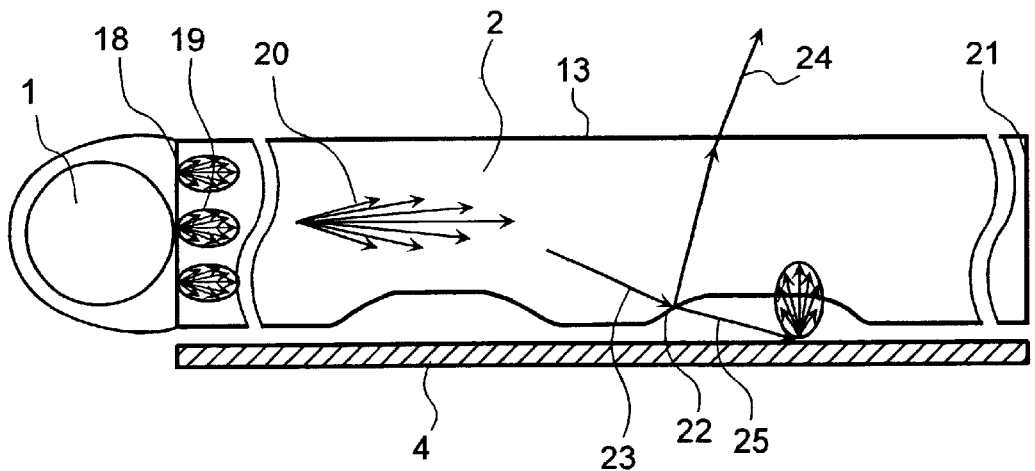
FIG. 5 is a diagram used to explain a light locus in the illumination equipment of the light guide plate that is used for the present invention.

FIG. 5 shows the locus of the light guide plate for a light wave that progresses inside of the light guide plate 2 of the present invention. The light from light source 1 is projected into the light guide plate 2 as incident light 19 at one end 18 of the light guide plate 2, and it becomes light waves 20. The light waves 20 progress toward the other end 21, repeating all reflections between the underneath surface of the light guide plate and the top face 13 at which light is emitted from the light guide plate. Light 23 that is directed at a dot inclination face 22 includes light waves 20 that reflect off the inclined surface and are directed to the face 13, are refracted at the surface 13 of the light guide plate, and emerge as light 24 from face 13. On the other hand, the light that is not reflected at the surfaces 22 becomes dot slope transmission light 25, which is reflected at the reflection sheet 4, and is injected into light guide plate 2 again. Part of this light which is reflected by reflection sheet 4 comes out of the face 13, and the remainder becomes light guide plate light 20 again. Therefore, it starts in light guide plate 2 gradually as light waves 20, and it is reflected upwardly through the light emitting surfaces 13 by the dots so that the liquid crystal display elements can be illuminated by properly arranging the dots.

Figure 6:
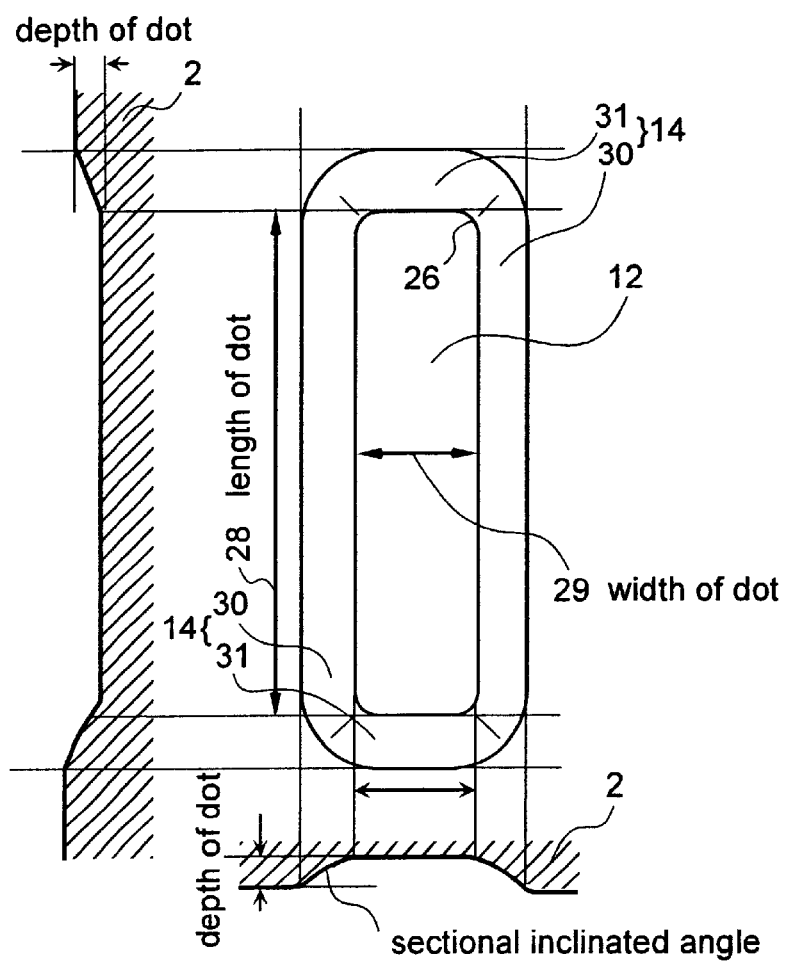
FIG. 6 is a diagram of the dot shape of a light guide plate that is used for the present invention.

FIG. 6 shows the shape of a suitable dot as seen from above in a projection of the dot on face 13 of the light guide plate. The dot is substantially rectangular in form with slanting side surfaces and rounded corners 26. The reason for this shape is because the area of the dot reflection face 22 can be increased relative to a circular shape or a square shape having the same dot base area, and so the number of dots can be reduced. That is, the degree of freedom of dot distribution also is improved, and creation of mask and dot coordinate data also becomes easy. And, the roundness 26 has an effect of reducing scattering and raising the front face brightness. As shown in FIG. 6, the length of a long side is referred to as a dot bottom unit dot length 28, and the length of a short side is referred to as a dot width 29.

The direction of a dot is arranged so that the slope 30 of a dot length side 28 is substantially in parallel with the X direction 16. The reason for such an arrangement is because the light from light source 1 can be reflected efficiently, because the area 30 is wider than the slope 31 of the short dot side.

As for the size of a dot, it is desirable that the dot length 28 is 80–800 µm. The reason for this is that, when the length 28 becomes larger than 800 µm, and users of a personal computer, for example, look at a liquid crystal display, the shape of a dot formed out of a character and a pattern appears at the light guide plate, and so distinguishing between a dot, a character and a figure becomes difficult. When the length 28 becomes smaller than 80 µm, the dots appear in large numbers, and the mask and dot coordinate data creation form shapes that make it difficult to distinguish. When the cost of mask manufacture is considered, the optimum value is 100 µm or more, and when display appearance is considered, 300 µm or less is desirable.

As for the dot width 29, it is desirable that it is 60 µm or less. The reason is because the rate of dot slope 14 that is occupied in the dot area when the length 29 becomes larger than 60 µm is reduced, and it becomes difficult to obtain a sufficient reflection face. In addition, it is desirable that, to gain a brightness that is also sufficient in the four corners of the light guide plate 2, the width 29 should be 45 µm. And, when the width 29 is 20 µm or more, an inexpensive mask can be used. The exposure machine, while at the lower limit, since it uses a mask during exposure, has a problem to achieve the required precision of the resist layer. In addition, 30 µm or more is desirable.

As for the depth of a dot, 5–20 µm is proper. The reason is because the dot shape is hard to form. That is, to obtain a depth of 20 µm or more, a viscous resist material must be used, and the plane of the surface of a dot formation face declines, and when forming light guide plate 2, the transcription declines. When the depth of a one-sided dot is as small as 5 µm, the rate that is occupied in the dot area of dot slope unit 14 reduces, and the required brightness cannot be achieved. And, as for the above thickness when it is considered that a liquid-form resist is used, 6–12 μm is optimum.

Figure 7:
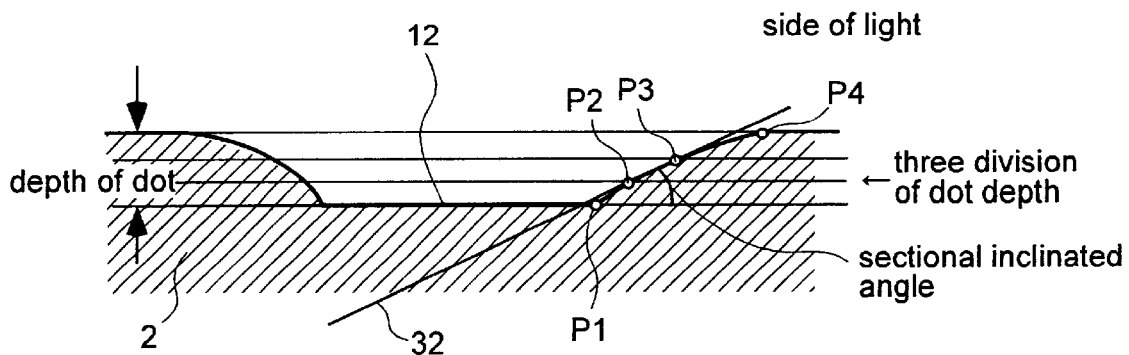
FIG. 7 is a diagram of the section inclination angle of a light guide plate that is used for the present invention.

As for the section inclination angle of the present invention, 20°–35° is suitable, and an optimum value is 28°±4°. The section inclination angle will be explained by reference to FIG. 7. FIG. 7 is a cross section through the center of a dot, and a dot section formed by a dot cutting plane that is parallel to the light guide plate cutting plane 15 of FIG. 4 is shown. Determination of the cutting plane like this is done since the slope 30 of the dot length side causes a change in the direction of light.

A section inclination angle is calculated by the following methods. As shown in FIG. 7, the dot depth is divided equally into three divisions, and each division line intersects a point of the slope on the side surface of the dot, on which intersection points a light source is depicted P1 at P2, at P3, and at P4, representing light reflection points. Next, an angle between straight line 32 and dot base 12 through P2 and P3 is shown, and this is designated as a section inclination angle. The section inclination angle controls the dispersion of the light and the efficiency of light reflection, and is an important relation.

By regulating the inclination angle relative to the ranges mentioned above, a distribution of the angles at which light rays traveling through the light guide plate exit the latter can be optimized, and, at the same time, the axial luminance (i.e., luminance as viewed in the direction perpendicular to the light-transmissive surface or a coextensive plane of the backlighting light guide panel) can be increased while suppressing the quantity of light rays exiting obliquely from the light guide plate. That is, when the section inclination angle exceeds 35°, the rate of the light that is entirely reflected at the dot slope is reduced, and the efficiency drops. And, when it is made smaller than 20°, the angle between the light that is reflected at the dot slope and the light-transmissive surface of a light guide plate does not sufficiently enlarge. Therefore, the efficiency is reduced.

In accordance with the present invention, it is desirable that in the section shape in a direction that is perpendicular to the light source of a dot, the lower surface of the dot is substantially a straight line. This is because one can decrease the slope with a gradual inclination by making the lower surface of this dot a straight line, and unnecessary light reflection can be decreased. By optimizing the dot shape to form a small concave as mentioned above, in comparison with a circular dot or a square dot, the brightness is improved by 10%, and in comparison with an ink dot, the brightness is improved by 20% or more.

Figure 8:
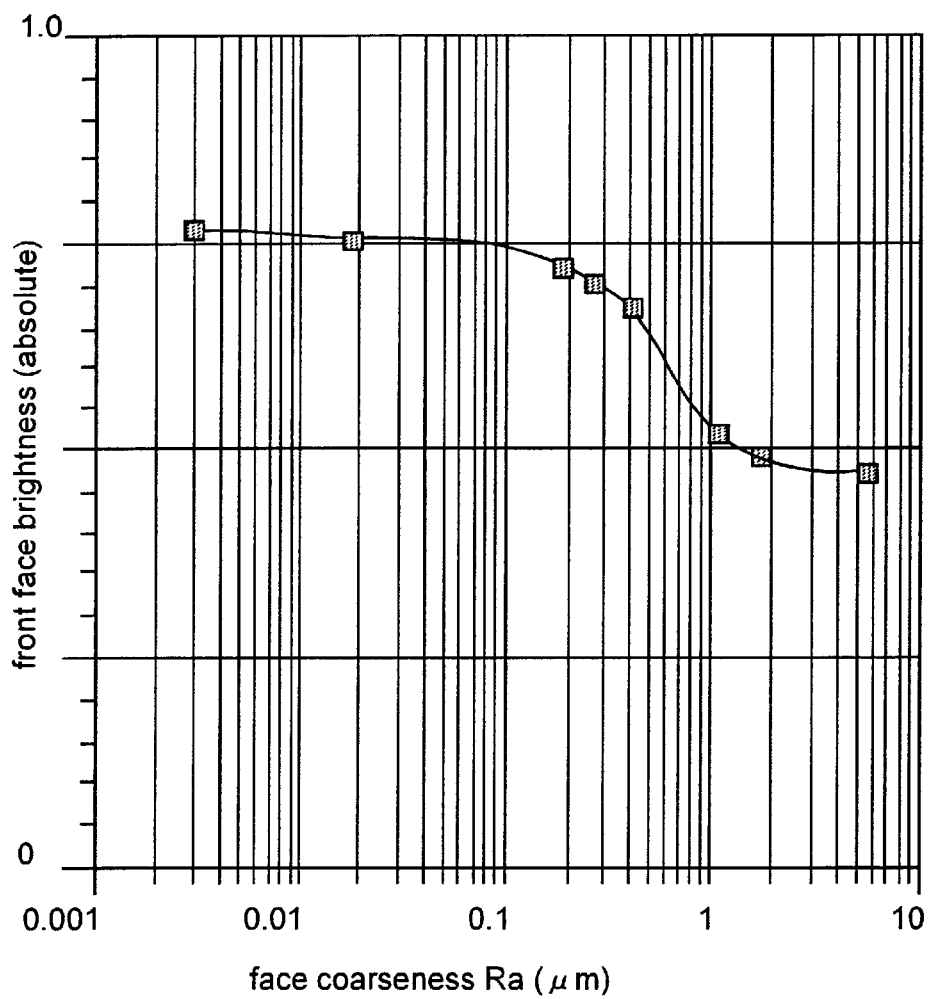
FIG. 8 is a graph of the surface coarseness RA and front face brightness of a light guide plate that is used for the present invention.

In accordance with the present invention, light is projected outside of the light guide plate 2 by reflection and refraction from the sloped surface of a dot, and light is spread to every nook and corner in the light guide plate 2 by using a positive reflection of a part of the light traveling in the light guide plate 2. Therefore, loss at the time of a reflection and refraction can be reduced by making the surface coarseness of the slope surface of a light guide plate small, so that a brightness improvement can be achieved. Because the surface coarseness of a light guide plate surface becomes small compared to the slope surface, it is important to repress the surface coarseness of a slope surface especially. FIG. 8 shows the relation between the face coarseness (RA) of the slope surface (slope between P2 and P3) of the dot of a light guide plate and front face brightness. As for RA, 0.4 μm or less is desirable.

Figure 9:
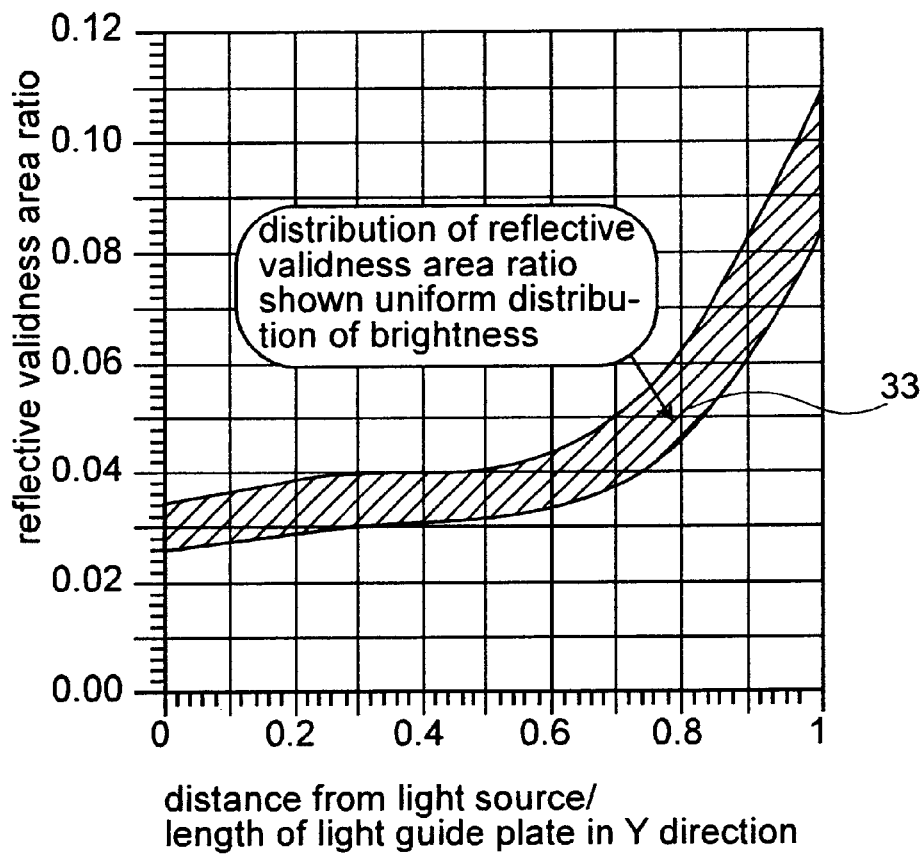
FIG. 9 is a graph forming a dot reflection valitness area ratio distribution diagram of a light guide plate that is used for the present invention.

As for the density of a dot, it is desirable that to achieve equalization of the brightness distribution, the nearer to the light source 1, the smaller is the dot density to be. Concretely, when the length in the Y direction 17 of a light guide plate is 191 mm±20 mm, the thickness of the entrance of the light guide plate 2 is 2.3 mm±0.5 mm, the thickness of the part that is farthest from the light source 1 of light guide plate 2 is 1.3 mm±0.3 mm, and the Y direction distribution of a light guide plate center is as shown in the graph of FIG. 9, [wherein the abscissa shows distance from the light source (L)/length of light guide plate in the Y direction $L_0$] or $Z=L/L_0$, and the ordinate shows the reflection validness area ratio (RV). The reflection validness area ratio (RV))=[Dot length×Dot height/sin (Section inclination angle)×Number of dots per a unit area]÷Unit area. The reflection validness area ratio desirably should exist in the range 33 that is shown in cross-hatching in FIG. 9, i.e. 0.5<RV<0.95.

Concretely, the reflection validness area ratio is as follows, determined in the range of 0.05<RV<0.95, $K_1Z^5+K_2Z^4+K_3Z^3+K_4Z^2+K_5Z^1+K_6+C1$<the reflection validness area ratio of $K_1Z^5+K_2Z^4+K_3Z^3+K_4Z^2+K_5Z^1+K_6+$C2 Here, $K_1$=−0.2330335, $K_2$=+0.7497230,
$K_3$=−0.6375126, $K_4$=+0.1875481,
$K_5$=−0.0011018, $K_6$=+0.0298941,
C1 =−0.004, C2 =+0.004.

Uniform brightness can be gained over the entire liquid crystal display surface by setting the reflection validness area ratio according to this distribution. At this time, the reflection validness area ratio is calculated by using numeric expression 1. The method of specifying a distribution of the dot density by using the reflection validness area ratio makes it possible to properly carry out a design change in case of changing the size of a dot and the shape as compared with a method of using a dot density and constant dot rate simply. This is because the slope of a long side of the dot in a direction that is far from the light source 1, as shown in FIG. 6, the dot base 12 and the slope 31 of a short dot side almost have the function that takes out light.

The dots or reflecting slant portions should preferably be disposed at random. Otherwise, moire phenomenon will make an appearance due to interference of the dot array with other regular patterns, such as patterns of liquid crystal cells, the color filter, TFT patterns (thin-film transistor pattern) and/or a black stripe array, because the dots of the present invention are minute.

Rear illumination equipment in which the light guide plate of the present invention and the polarizability film of a reflection type (cholesteric liquid crystal film and ¼ phase board) were combined has a large brightness improvement effect as compared to rear illumination equipment formed by the combination of a light guide plate using ink dots, a cholesteric liquid crystal film and ¼ phase sheet, or rear illumination equipment in which the light guide plate that is formed with grating grooves, a cholesteric liquid crystal film and ¼ phase board were combined. In addition, the light guide plate of the present invention is easier to manufacture than the light guide plate that is formed with grating grooves, and it is desirable when the light guide plate of the present invention, a cholesteric liquid crystal film and ¼ phase board are combined.

In the following, various embodiments of the present invention will be explained with reference to the drawing.

(Embodiment 1)

Figure 10:
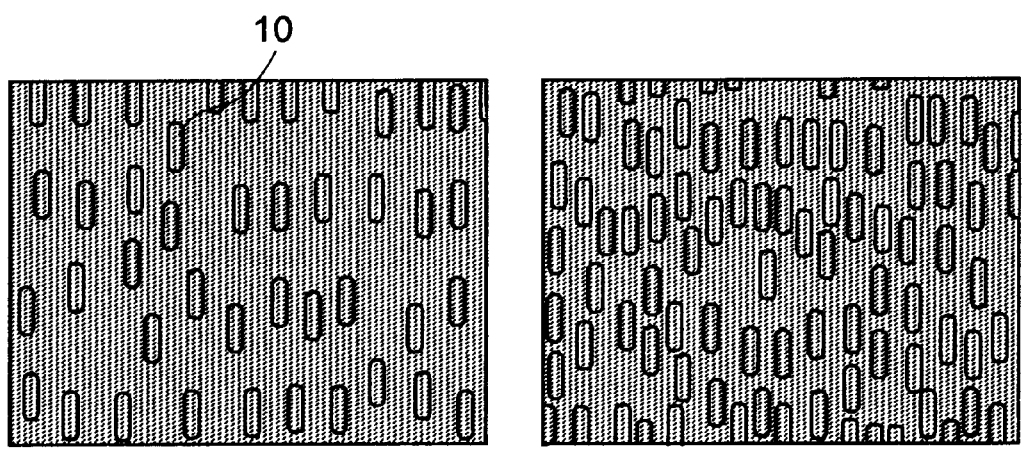
FIG. 10 is a diagram of a dot random arrangement of a light guide plate that is used for the present invention.

FIG. 1 is the perspective view of the rear illumination equipment that is used for the liquid crystal display of the present invention. FIG. 6 shows shape of the dot (small concave) as an example. In this example, the length 28 of a dot was made 200 μm, the width 29 of a dot was made 40 μm, and the depth of a dot was made 8 μm. This rear illumination equipment includes light source 1, light guide plate 2 and reflection sheet 4 as main components, and in light guide plate 2, a plurality of dots are formed in the under surface thereof. And, the dots are randomly arranged. An example of the dot assignment is shown in FIG. 10. Moire can be prevented from occurring by using such a random assignment. And, in this example, a diffusion sheet 5 and two condensing sheets 6 and 7 are used in addition to the main components, as seen in FIG. 2.

Figure 11:
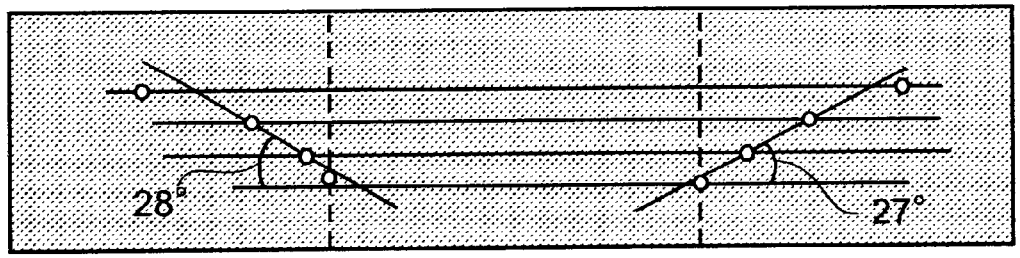
FIG. 11 is a diagram of the section inclination angle of a light guide plate that is used for the present invention.
Figure 12:
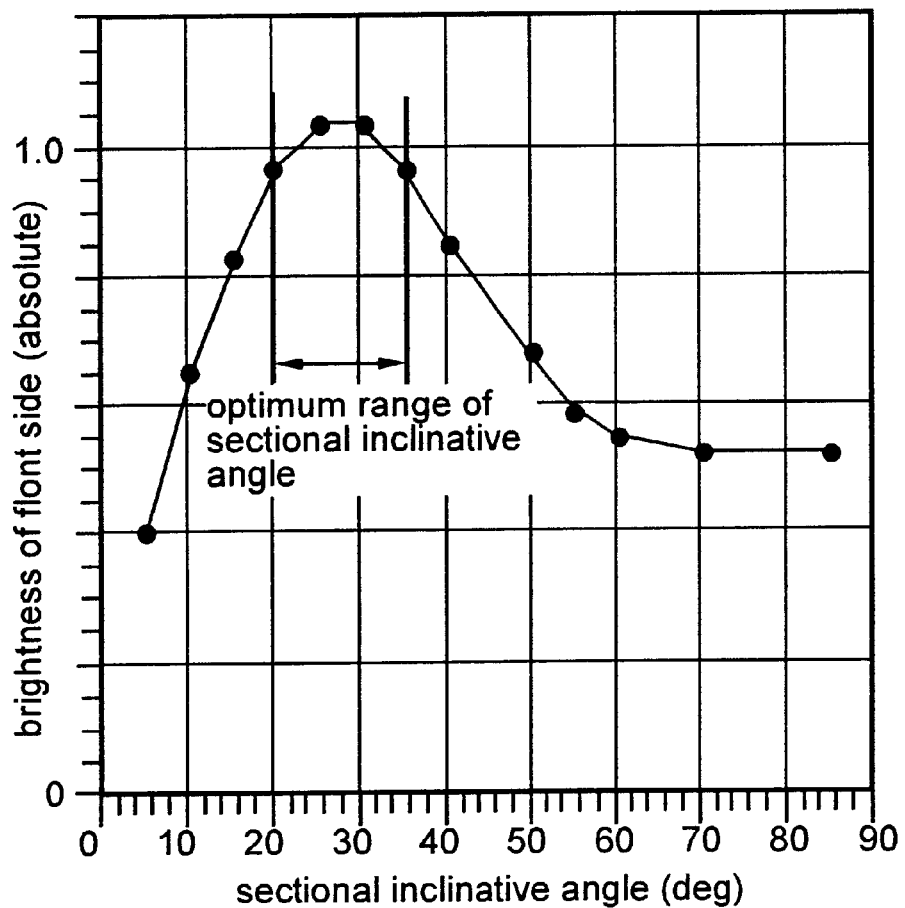
FIG. 12 is a graph of the section inclination angle and front face brightness of a light guide plate that is used for the present invention.
Figure 13:
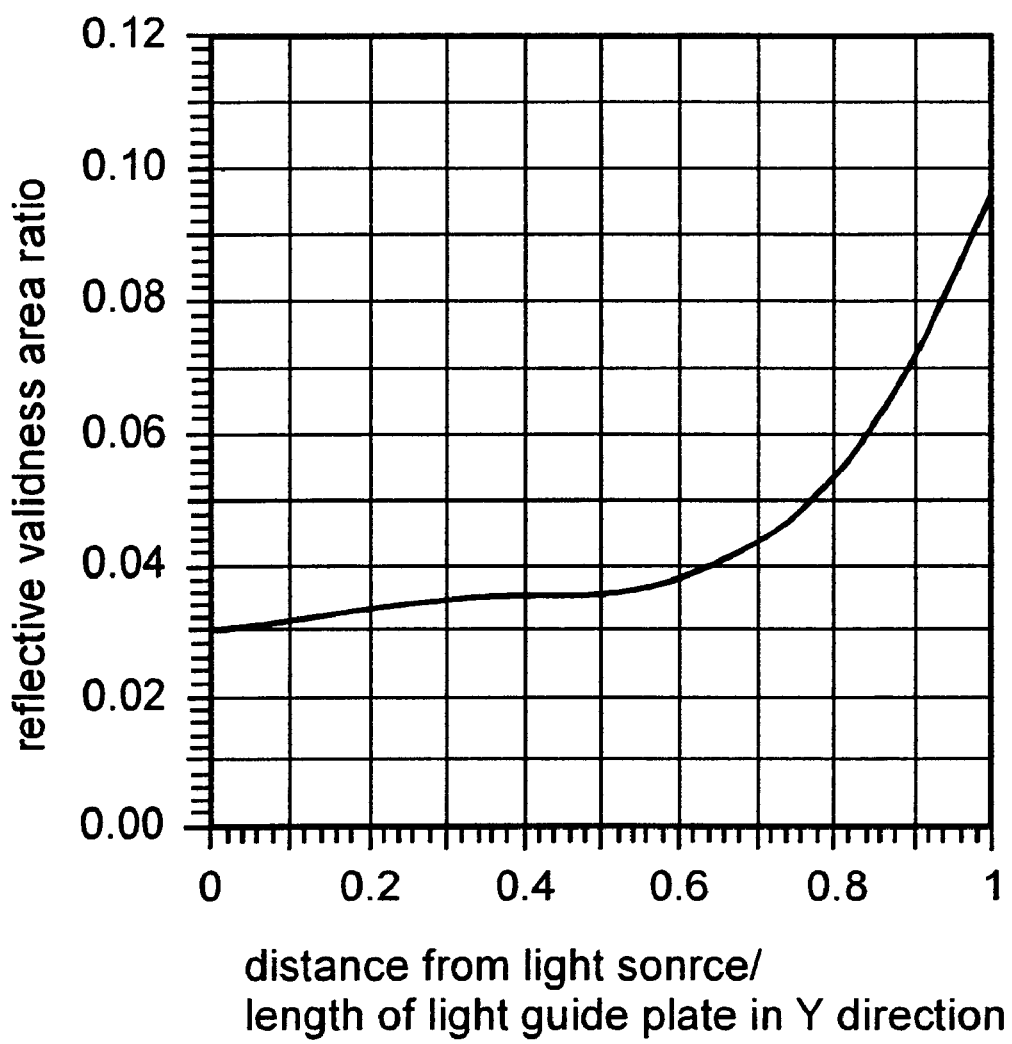
FIG. 13 is a graph forming a dot reflection validness area ratio distribution diagram of a light guide plate that is used for the present invention.

FIG. 11 shows the dot section shape of light guide plate 2 manufactured according to this example. The section inclination angle is 28°. FIG. 12 illustrates the average brightness of the section inclination angle, according to this example, relative to the light guide plate. As for the dot section inclination angle, as understood from FIG. 12, 20°–35° is pertinent, and an optimum value is 28°±3°. FIG. 13 shows the distribution of the reflection validness area ratio of a dot.

(Embodiment 2)

Figure 17:
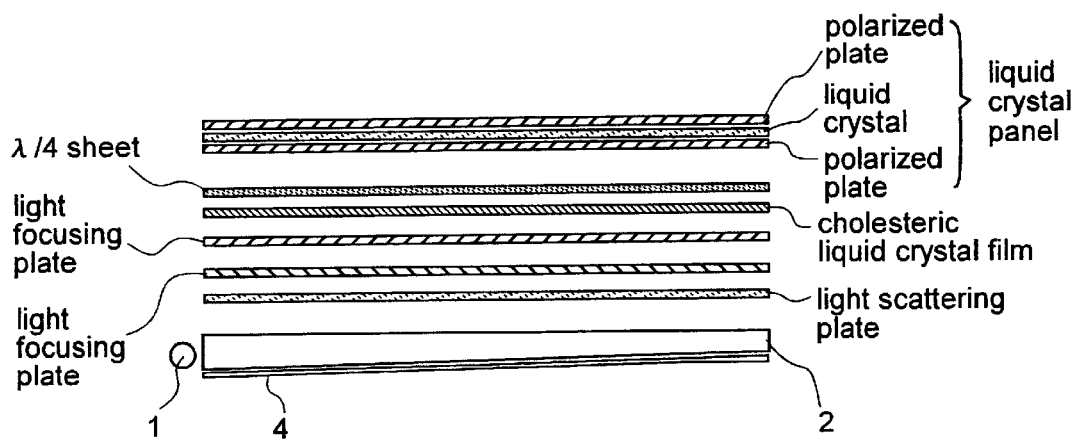
FIG. 17 is a side sectional view of a liquid crystal display using a cholesteric liquid crystal film.

FIG. 17 is a structural diagram of a liquid crystal display using a cholesteric liquid crystal film. We compared and examined each brightness improvement effect of Embodiment 2, that uses the light guide plate of the present invention for the light guide plate in FIG. 17, with a comparison example 1 using the light guide plate of an ink dot method and comparison example 2 using a light guide plate with grating grooves.

Figure 18A:
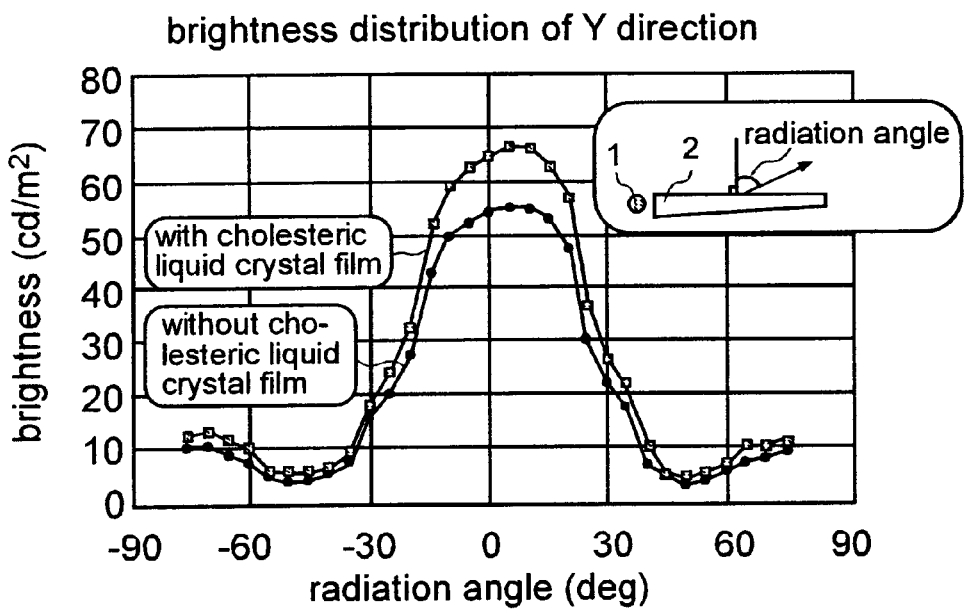
FIGS. 18(*a*) and 18(*b*) are graphs showing the effect of a cholesteric liquid crystal film of example 2 of the present invention.
Figure 18B:
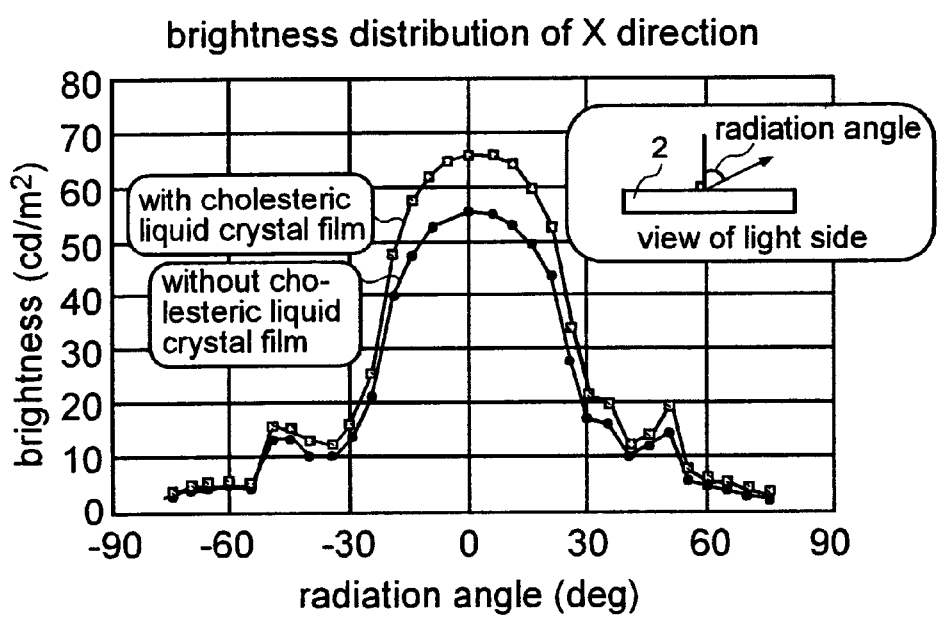

FIG. 18(a) and FIG. 18(b) are graphs showing the brightness distribution in the X direction and the Y direction in above embodiment 2 in comparison with the brightness distribution in the X direction and the Y direction for those cases in which the cholesteric liquid crystal film and λ/4 sheet, respectively, are removed from the structure of embodiment 2. Anything in an X direction and Y direction has 20% brightness improvement effects with the present invention.

Figure 19A:
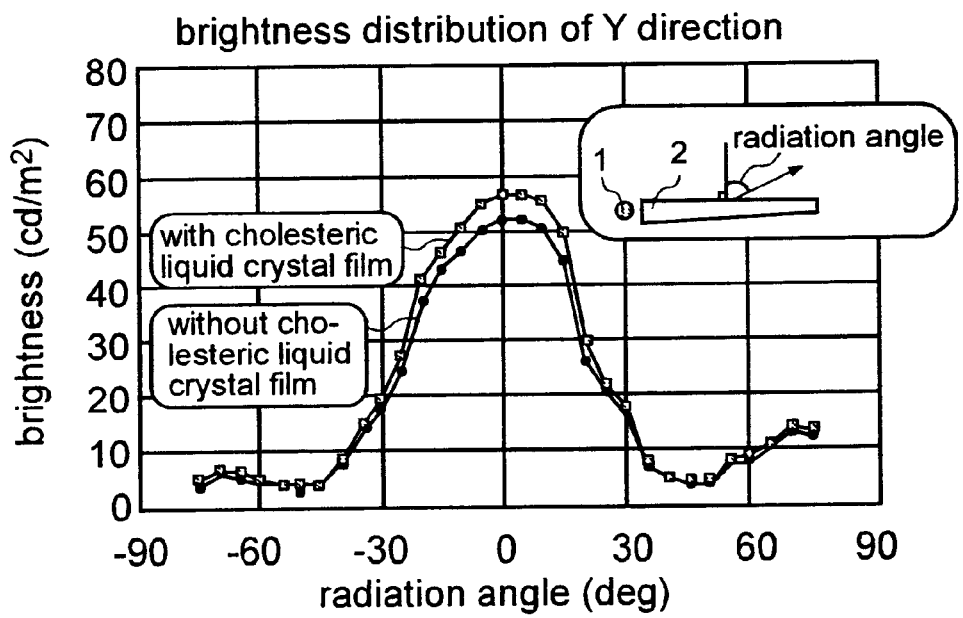
FIGS. 19(*a*) and 19(*b*) are graphs showing the effect of a cholesteric liquid crystal film of comparison example 1.
Figure 19B:
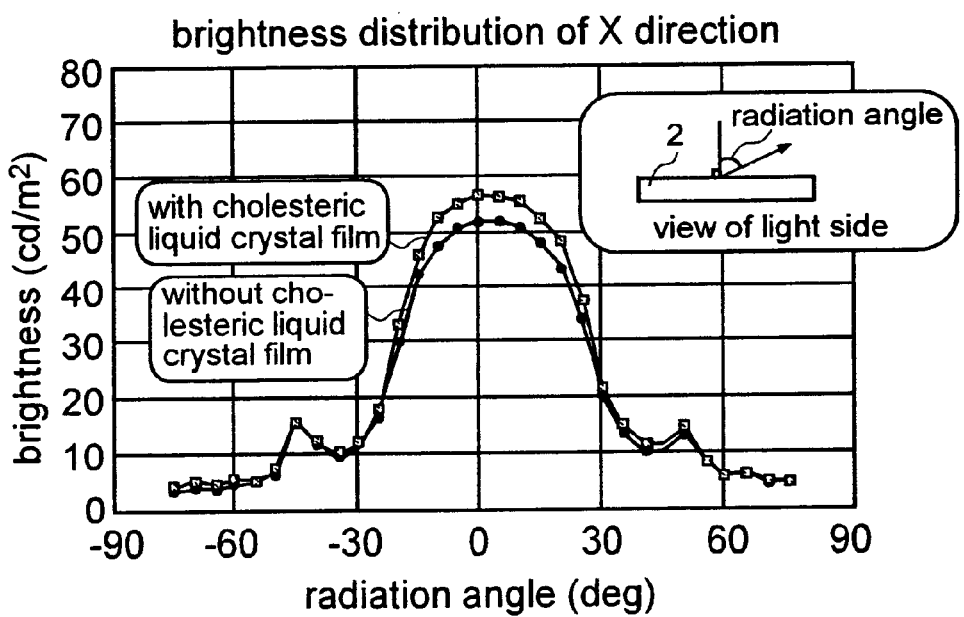

FIG. 19(a) and FIG. 19(b) are graphs showing the brightness distribution in the X direction and the Y direction above comparison example 1 in comparison with the brightness distribution in the X direction and the Y direction for those cases in which the cholesteric liquid crystal film and λ/4 board, respectively, are removed from the structure of comparison example 1. Anything in an X direction and Y direction has 10% brightness improvement effects.

Figure 20A:
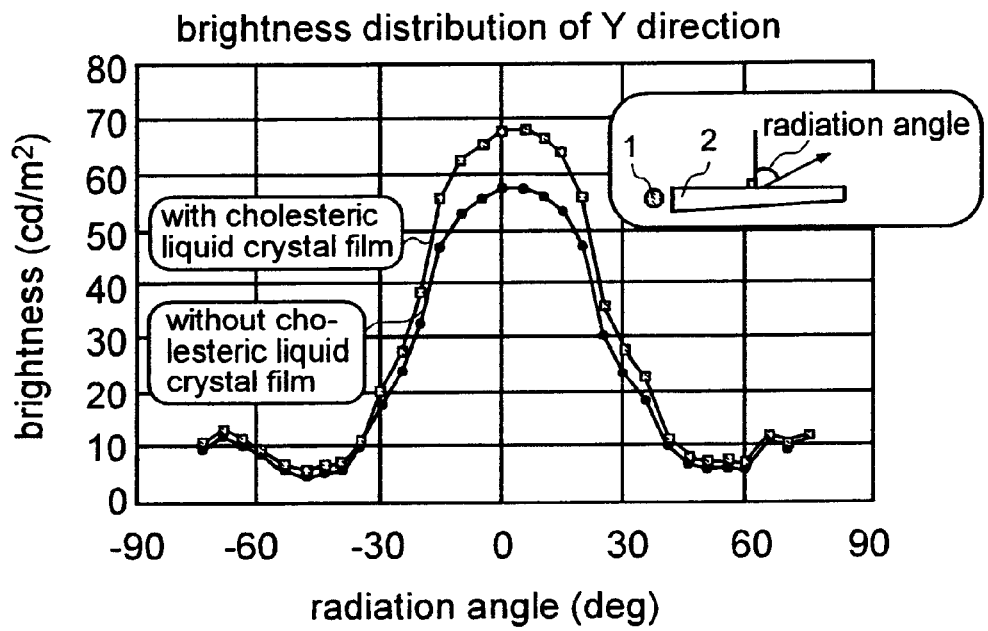
FIGS. 20(*a*) and 20(*b*) are graphs showing the effect of a cholesteric liquid crystal film of comparison example 2.
Figure 20B:
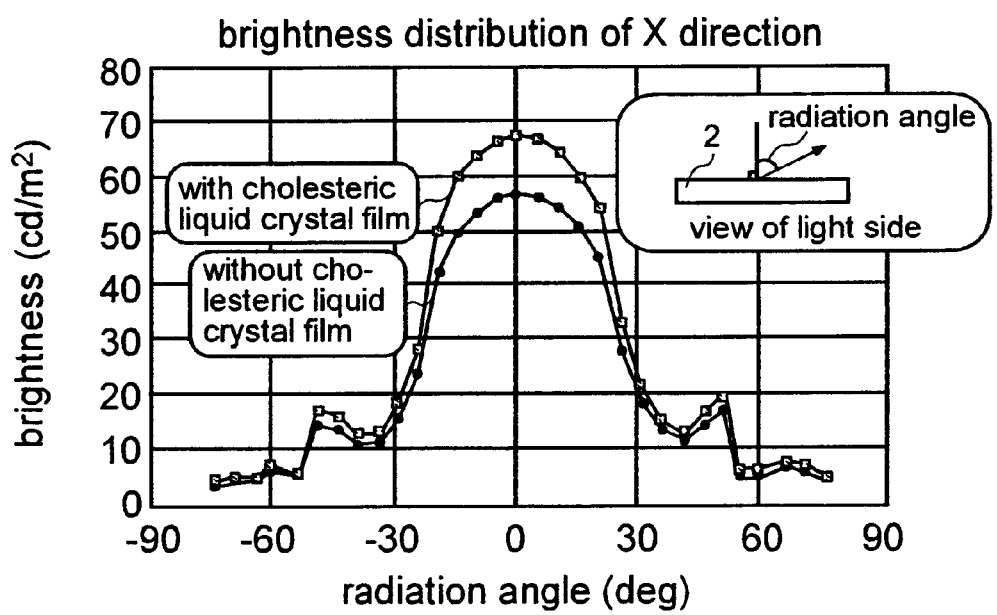

FIG. 20(a) and FIG. 20(b) are graphs showing the brightness distribution in the X direction and the Y direction in above comparison example 2 in comparison with the brightness distribution in the X direction and the Y direction for those cases in which the cholesteric liquid crystal film and λ/4 sheet, respectively, are removed from the structure of embodiment 1. Anything in an X direction and Y direction has 20% brightness improvement effects.

As for the light guide plate according to the present invention, a brightness improvement effect on the cholesteric liquid crystal film is higher than in a light guide plate formed of the ink dot method; and, it has a brightness improvement effect that is equal to the light guide plate having grating grooves. In addition, even in a case where a cholesteric liquid crystal film is not used, the brightness of the liquid crystal display using a light guide plate according to the present invention is 10% or more higher than one formed by an ink dot method, and more than equal to one having grating grooves. In addition, the present invention is excellent as compared to the use of grating grooves from the point of view of the uniformity of the brightness distribution in the face and the ease of metal mold manufacturing.

Table 1 is a table concerning the liquid crystal display of the present invention and the liquid crystal display of the above comparison example, in which the brightness change in the presence or absence of a cholesteric liquid crystal film and the associated problems have been summarized.

TABLE 1

| LIQUID CRYSTAL DISPLAY | EMBODIMENT 2 | | COMPARISON EXAMPLE 1 INK DOT METHOD | | COMPARISON EXAMPLE 2 GRATING METHOD | |
|---|---|---|---|---|---|---|
| POLARIZABILITY FILM OF A *1 REFLECTION TYPE | NOTHING | THERE IS | NOTHING | THERE IS | NOTHING | THERE IS |
| FRONT FACE BRIGHTNESS *2 | 111 | 135 | 100 | 108 | 110 | 132 |
| PROBLEM IN CASE OF MASS-PRODUCING | NOTHING | NOTHING | NOTHING | NOTHING | NOTHING | THE X DIRECTION BRIGHTNESS DISTRIBUTION IS DIFFICULT TO AMEND. IT IS DIFFICULT TO MANUFACTURE A METAL MOLD |
| COST | ⊚ | ○ | ○ | Δ | x | xx |
| INTERPRETATION | ○ | ○ | Δ | Δ | x | x |

*1 CHOLESTERIC LIQUID CRYSTAL FILM IS USED.
*2 IT IS A RELATIVE VALUE WHEN BRIGHTNESS IN CASE THERE IS NOT AN INK DOT REFLECTION POLARIZATION FILM IS MADE 100.

As can be seen, a light guide plate according to the present invention has brightness that is more equal than that of the light guide plate of a conventional ink dot method and a liquid crystal display using a cholesteric liquid crystal film, and the present invention is predominant in the point of production cost. In addition, in case high brightness is necessary, the liquid crystal display that uses a light guide plate according to the present invention combined with a cholesteric liquid crystal film is excellent. And, even if a polarizability film other than a cholesteric liquid crystal film of a reflection type is used, the same effect can be gained.

Now, a method of manufacturing a light guide plate for rear illumination equipment according to the present invention will be explained.

As a method of manufacturing a light guide plate, a metal mold is manufactured, and the light guide plate is plastically molded using the metal mold. As for the number of the dots that consist of small concaves on the light guide plate, applying the manufacturing method that is described below so that the light guide plate becomes a 12.1 inch plate, 500,000–2,000,000 dots are provided in the light guide plate, and the fact that it becomes a huge number is fine.

Figure 14:
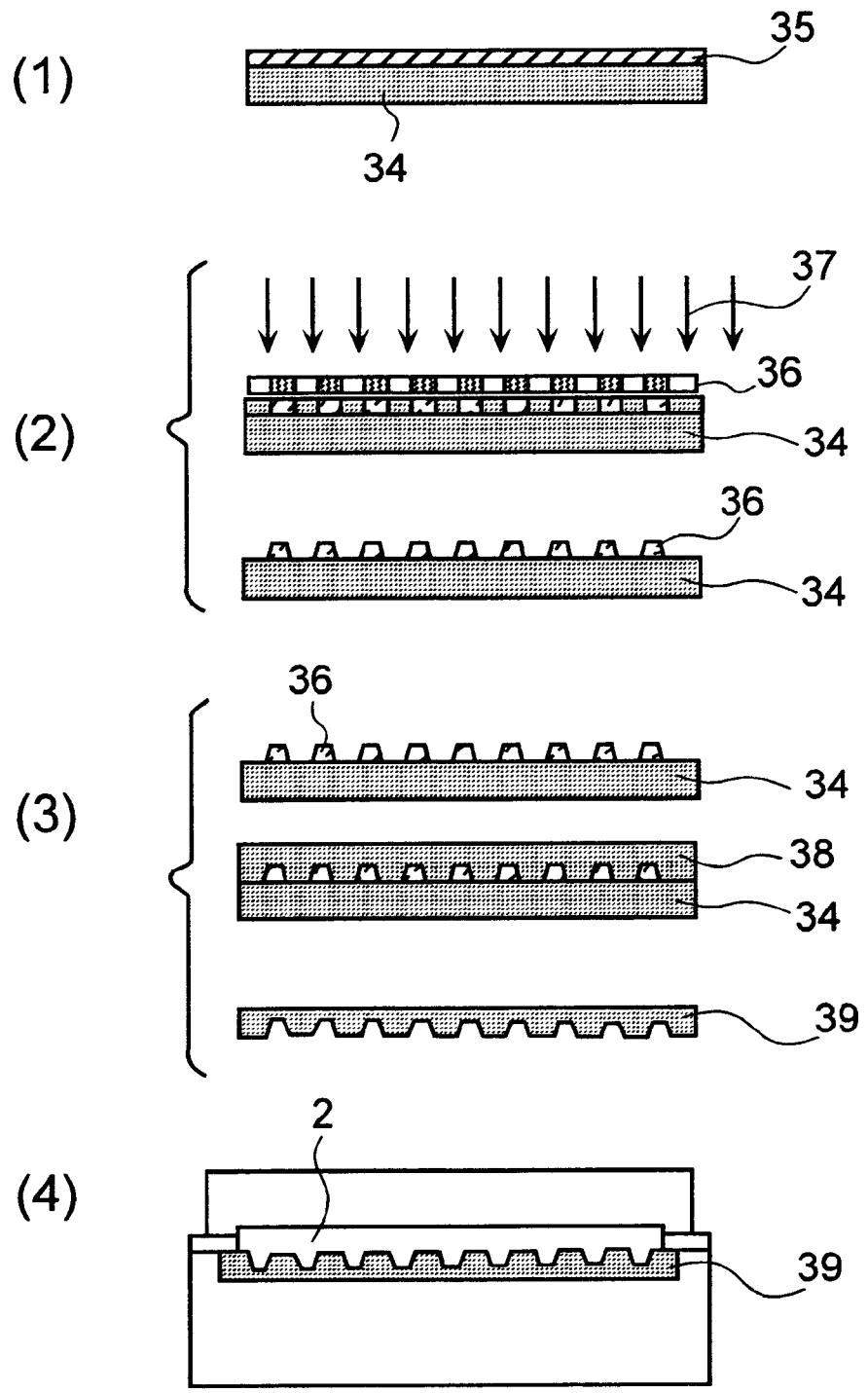
FIG. 14 is the flow chart that shows a method of manufacturing a light guide plate that is used for the present invention.

FIG. 14 is a process flow diagram that illustrates the manufacturing method. The present invention has the following processes.
(1) Process that forms photo resistance 35 on substrate 34;
(2) Process that develops a photo resist layer after arranging a mask 36 with the dot pattern above the substrate 34 and irradiating ultraviolet rays 37 from the upper part of mask 36 to form the dot pattern on the substrate 34;
(3) Process that forms a stamper 39 that consists of plating layers 38 formed by metal plating on the dot pattern; and
(4) Process which, by using the stamper 39 light guide plate 2 is plastically molded.

A glass plate, etc. ground to have a mirror surface is used as the substrate 34 in this process. Before forming photo resist layer 35, an adhesive improvement agent of a silane system can be applied in advance. As a photo resist material, a liquid-form, a positive film-form type and a material of a negative type are available. There are a method of spin coating and a method of roll coating as possible film formation methods. It is possible to change the depth of a small concave by controlling the thickness of the photo resist layer. And, by setting the conditions of exposure, development and annealing, the section inclination angle can be controlled. Various masks, such as a chrome mask, a film mask and an emulsion mask, can be used for the photo mask 36, which are designed to establish the size and the number of dots in advance. Data, such as the distribution and a drawing by an electron beam, a laser beam, etc. are also determined in advance. When a conduction film is formed to form stamper 39, before forming plating layer 38, plating layer that is, 38 of the uneven of plating that is not and is favorable. It is a material of which while as a material of a conduction layer and a plating layer, various metals can be used, but Ni (nickel) is optimum in the point of uniform and mechanical performance. Obtained plating layer 38 can exfoliate physically and easily from substrate 34. It is finished by grinding according to necessity and is used as stamper 39.

Obtained stamper 39 is fixed to the matrix of, for example, an injection molding machine with a magnet, a vacuum chuck, etc., and light guide plate 2 is plastically molded. It is possible to mold light guide plate 2 by ejection molding and compression, a vacuum molding, etc. other than by using the above method of manufacturing the light guide plate 2 by an injection molding machine as shown.

As a material that constitutes the light guide plate 2, a plastic transparent material is available. There are an acrylic system plastic, a polycarbonate resin, a polyacetal resin, a polyurethane system resin and a plastic material of an ultraviolet hardening type. An acrylic system material is a material that is considered excellent from the point of view of transparency, price and moldability and is suitable for a present invention.

Now, the structure of a liquid crystal display will be explained.

Figure 15:
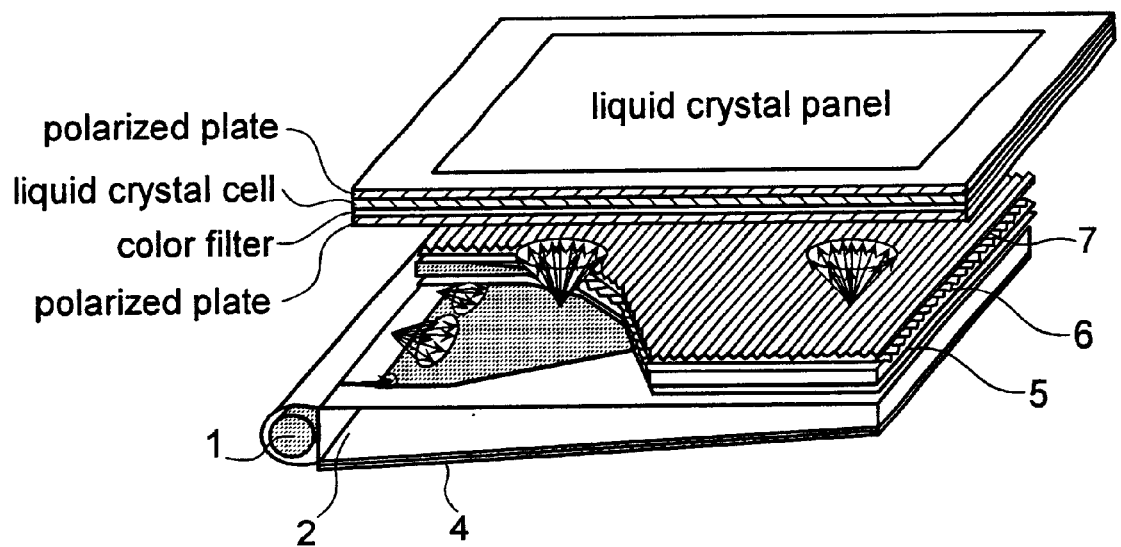
FIG. 15 is a perspective view of the liquid crystal display according to an embodiment of the present invention.
Figure 16:
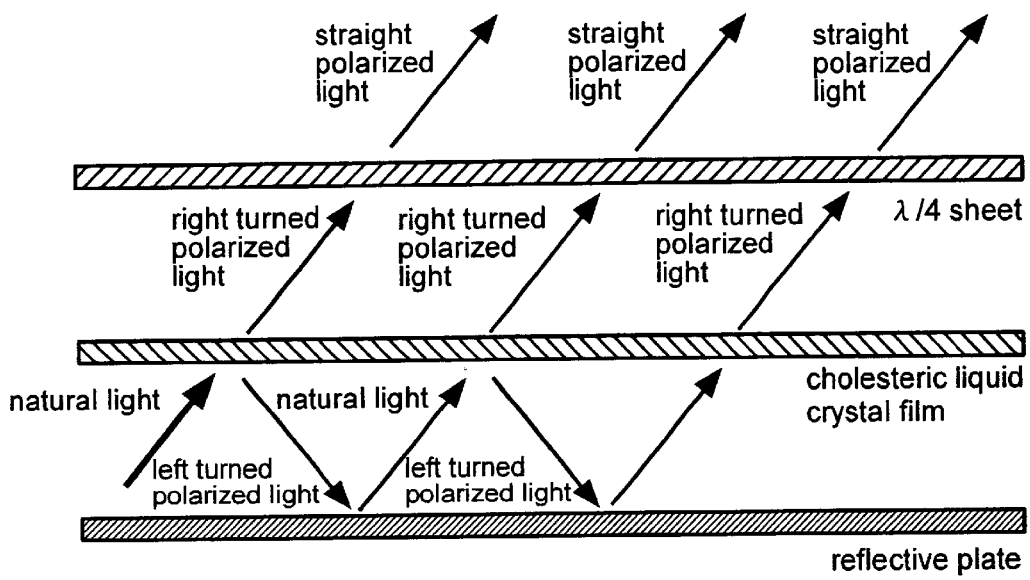
FIG. 16 is a diagram of a liquid crystal display using a cholesteric liquid crystal film.

The main unit structure of the liquid crystal display of the present invention is shown in FIG. 15. A deflection board, a liquid crystal cell, a common electrode, a color filter and a polarization layer are installed over the light emitting surface of the rear illumination equipment. This structure represents a general example of a liquid crystal display. For example, an especially wide angle of visibility is required from the liquid crystal display of a desk top type display unit or a television monitor of a personal computer. The diffusion board that makes the angle of visibility expand about which illumination light is scattered in this case can be arranged in a desired position. And, a prism sheet is provided, and a sheet that has an optical diffusion effect to spread the angle of visibility, after irradiating a liquid crystal cell with illumination light with further high directivity. The optical scattering function is made to hold, and the angle of visibility can be spread. As an embodiment of the light source 1, a cold cathode pipe, a hot cathode pipe, a tungsten lamp, a xenon lamp, a metal halide lamp, etc. can be used. The light source of a low temperature system like a normally cold cathode pipe is desirable.

The liquid crystal device to which the present invention can find general application and is never restricted to any specific application, but can be applied to conventional liquid crystal devices or liquid crystal device panels known heretofore. As the liquid cell arrays to which the invention can find application, there may be mentioned generally twist mnematic, super-twist mnematic, homogenous, thin film transistor or the like type, or a liquid crystal cell array of the active matrix driving type or a simple matrix driving type.

As to the reflection polarizability film that is used for the present invention, the invention is not especially limited, and well-known films such as a cholesteric liquid crystal film can be used. Concretely, DBEF (trademark) manufactured by the 3M company, TRANSMAX (trademark), etc. manufactured by the MERCK company, can be used.

As described, a liquid crystal display having a multifunction and highly efficient characteristics that are stabilized without generation of uneven brightness, with an improved brightness, is provided by the present invention.

What is claimed is:
1. A liquid crystal display, comprising:
a liquid crystal display panel having a plurality of liquid crystal cells,
a back light that irradiates the liquid crystal display panel with irradiation light,
wherein said back light includes:
a light source, and
a light guide plate having one side arranged adjacent said light source and having a planar surface with a plurality of small concaves, said planar surface being almost parallel to a liquid crystal cell face, and wherein a plane shape of said small concaves is almost rectangular.
2. A liquid crystal display according to claim 1, wherein a lower portion of said small concaves has a length in a direction that is parallel to an axis of illumination of said light source in the range of 80–800 μm, and a length in a direction that is perpendicular to the axis of illumination of said light source of 60 μm or less.

3. A liquid crystal display according to claim 1, wherein said small concaves have a depth in the range of 5–20 μm.

4. A liquid crystal display according to claim 1, wherein side surfaces of said small concaves have an inclination angle in the range of 20°–35°.

5. A liquid crystal display according to claim 1, wherein said small concaves have surfaces with a face coarseness of RA<0.4 μm.

6. A liquid crystal display according to claim 1, wherein said small concaves are randomly arranged.

7. A liquid crystal display according to claim 1, further comprising:
   a polarizer film of a reflection type which is arranged on the side of the light guide plate light-transmissive surface of the light guide plate.

8. A liquid crystal display according to claim 1, further comprising:
   a cholesteric liquid crystal film which is arranged on the side of the light guide plate light-transmissive surface of the light guide plate.

9. A liquid crystal display according to claim 1, further comprising:
   a cholesteric liquid crystal film and ¼ phase plate which is arranged on the side of the light guide plate light-transmissive surface of the light guide plate.

10. A liquid crystal display, comprising:
    a liquid crystal display panel having a plurality of liquid crystal cells;
    a back light that irradiates said liquid crystal display panel with irradiation light;
    a prism sheet which is located between said liquid crystal display panel and said back light;
    wherein said back light includes:
      a light source;
      a light guide plate having one side arranged adjacent said light source and having a planar surface with a plurality of small concaves, said planar surface being substantially parallel to a liquid crystal cell face;
      wherein a plane shape of said small concaves is substantially rectangular; and
      wherein side surfaces of said small concaves have an inclination angle in the range of 20°–35°.

11. A liquid crystal display according to claim 10, wherein the side surface of said small concaves have an inclination angle in the range of 25°–31°.

12. A liquid crystal display, comprising:
    a liquid crystal display panel having a plurality of liquid crystal cells,
    a back light that irradiates the liquid crystal display panel with irradiation light,
    wherein said back light includes:
      a light source, and
      a light guide plate having one side arranged adjacent said light source and having a planar surface with a plurality of small concaves, said planar surface being almost parallel to a liquid crystal cell face,
      wherein a plane shape of said small concaves is almost rectangular, and
      wherein a lower portion of said small concaves has a length in a direction that is parallel to an axis of illumination of said light source in the range of 80–800 μm, and a length in a direction that is perpendicular to the axis of illumination of said light source of 60 μm or less.

13. A liquid crystal display according to claim 12, wherein said small concaves have a depth in the range of 5–20 μm.

14. A liquid crystal display, comprising:
    a liquid crystal display panel having a plurality of liquid crystal cells,
    a back light that irradiates the liquid crystal display panel with irradiation light,
    wherein said back light includes:
      a light source, and
      a light guide plate having one side arranged adjacent said light source and having a planar surface with a plurality of small concaves, said planar surface being almost parallel to a liquid crystal cell face,
      wherein a plane shape of said small concaves is almost rectangular,
      wherein a lower portion of said small concaves has a length in a direction that is parallel to an axis of illumination of said light source in the range of 80–800 μm, and a length in a direction that is perpendicular to the axis of illumination of said light source of 60 μm or less,
      wherein said small concaves have a depth in the range of 5–20 μm, and
      wherein side surfaces of said small concaves have an inclination angle in the range of 20°–35°.

* * * * *